(12) United States Patent
Gunnarsson et al.

(10) Patent No.: US 8,654,728 B2
(45) Date of Patent: Feb. 18, 2014

(54) GENERATING UPLINK SIGNALS FROM USER EQUIPMENT NODES TO IDENTIFY INTERFERERS TO A NETWORK NODE

(75) Inventors: Fredrik Gunnarsson, Linkoping (SE); Angelo Centonza, Winchester (GB); Mojgan Fadaki, Solna (SE); Gunnar Mildh, Sollentuna (SE); Oumer Teyeb, Stockholm (SE); Elena Voltolina, Jarfalla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 139 days.

(21) Appl. No.: 13/303,271

(22) Filed: Nov. 23, 2011

(65) Prior Publication Data

US 2012/0275394 A1    Nov. 1, 2012

Related U.S. Application Data

(60) Provisional application No. 61/480,655, filed on Apr. 29, 2011.

(51) Int. Cl.
    *H04W 4/00*    (2009.01)
(52) U.S. Cl.
    USPC .......................................... 370/329; 370/359
(58) Field of Classification Search
    USPC .................................. 370/329, 359
    See application file for complete search history.

(56) References Cited

U.S. PATENT DOCUMENTS

| | | | | |
|---|---|---|---|---|
| 7,899,014 | B2* | 3/2011 | Li et al. | 370/332 |
| 2006/0050662 | A1* | 3/2006 | Rizvi et al. | 370/320 |
| 2008/0144486 | A1* | 6/2008 | Wilhelmsson et al. | 370/208 |
| 2008/0233967 | A1 | 9/2008 | Montojo et al. | |
| 2009/0179755 | A1 | 7/2009 | Bachl et al. | |
| 2009/0196192 | A1* | 8/2009 | Lim et al. | 370/252 |
| 2010/0008294 | A1 | 1/2010 | Palanki et al. | |
| 2010/0304753 | A1* | 12/2010 | Furuya | 455/450 |
| 2011/0151864 | A1* | 6/2011 | Byun et al. | 455/426.1 |
| 2011/0170440 | A1* | 7/2011 | Gaal et al. | 370/252 |
| 2012/0093093 | A1* | 4/2012 | Frenger et al. | 370/329 |
| 2012/0213189 | A1* | 8/2012 | Choi et al. | 370/329 |

FOREIGN PATENT DOCUMENTS

| | | |
|---|---|---|
| WO | WO 2008/056032 A1 | 5/2008 |
| WO | WO 2009/142559 A1 | 11/2009 |
| WO | WO 2011/047348 A1 | 4/2011 |

OTHER PUBLICATIONS

International Search Report, PCT Application No. PCT/SE2011/051498, May 7, 2012.
Written Opinion of the International Searching Authority, PCT Application No. PCT/PCT/SE2011/051498, May 7, 2012.
PCT International Preliminary Report on Patentability, Application No. PCT/SE2011/051498, Aug. 13, 2013.

\* cited by examiner

*Primary Examiner* — Gary Mui
(74) *Attorney, Agent, or Firm* — Myers Bigel Sibley & Sajovec

(57) ABSTRACT

A method is disclosed that can be performed in at least one network node which provides wireless communications service for user equipment nodes (UEs). The method includes detecting uplink interference at an interfered network node. Responsive to the uplink interference, an uplink transmission having a defined configuration is initiated from a UE, which is served by a serving network node. The uplink signal is detected using the defined configuration at the interfered network node. The UE is identified responsive to the detected uplink signal as being a contributor to the uplink interference. An uplink transmission by the UE and/or by another UE served by the serving network node is controlled to reduce uplink interference.

17 Claims, 13 Drawing Sheets

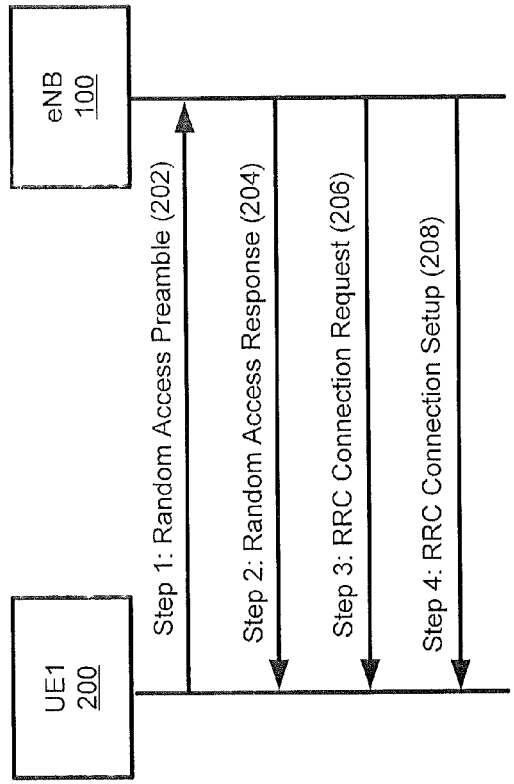
*FIGURE 2*
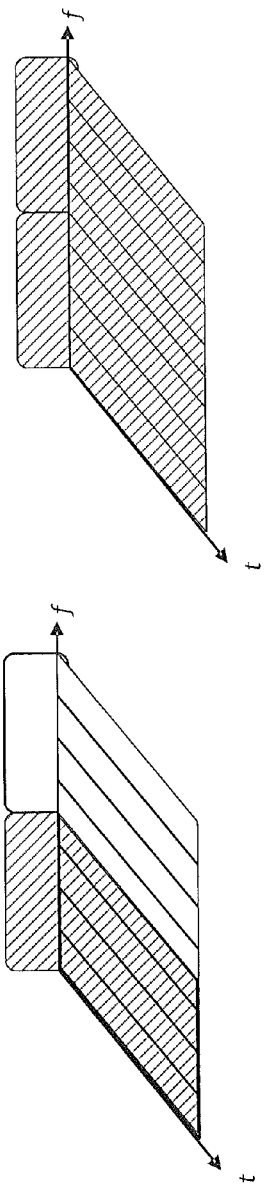
*FIGURE 3A*
*FIGURE 3B*

Control the UE from the serving network node to cause transmission of a demodulated reference signal containing data generated responsive to the defined configuration — 1900

FIGURE 19

Identify one or more interfered frequencies used by the interfered network node that are interfered with by the uplink signal transmitted by the UE — 2000

Control by the serving network node one or more frequencies used by the UE and/or by the other UE to avoid the identified one or more interfered frequencies — 2002

FIGURE 20

Coordinate a schedule of uplink transmissions for the UE between the serving network node and the interfered network node — 2100

Control uplink transmission from the UE responsive to the coordinated schedule — 2102

FIGURE 21

GENERATING UPLINK SIGNALS FROM USER EQUIPMENT NODES TO IDENTIFY INTERFERERS TO A NETWORK NODE

RELATED APPLICATIONS

The present application claims the benefit of priority from U.S. Provisional Application No. 61/480,655 entitled "Carrier Based Uplink Interferer Identification" filed Apr. 29, 2011, the disclosure of which is hereby incorporated herein in its entirety by reference.

TECHNICAL FIELD

The present invention relates to wireless communication systems and, more particularly, to management of interference by user equipment nodes to network nodes.

BACKGROUND

Interference management is an important aspect of radio resource management mechanisms in wireless communication systems. Interference may be suppressed by signal processing and/or avoided by assigning resources in an controlled manner to avoid/suppress interference. Mechanisms for interference management can be distributed to radio network nodes of the communication system, in which case information may be shared therebetween to avoid/suppress interference between the network nodes and/or between user equipment nodes (UEs) and the network nodes.

Technical Background: LTE Architecture

An example architecture of a 3G Long Term Evolution (LTE) system is shown in FIG. 1. FIG. 1 illustrates X2 logical interfaces between example eNodeBs or eNBs (Evolved Node Bs) 100',100", 100''' (also referred to as base stations), and S1 logical interferences between the eNBs 100',100", 100''' and example MMEs/S-GWs (Mobility Management Entity/Serving Gateway) 110',110". eNodeB is an acronym for an Evolved Universal Terrestrial Radio Access Network (E-UTRAN) NodeB.

LTE is based on a relatively flat system architecture compared to 2G and 3G systems. Each cell is served by a respective eNB 100',100",100''', and handovers between cells can be handled either via the respective MMEs 100',100" via the S1 interface, or directly between the eNBs via the X2 interface.

Neighbor Relations and the X2 Interface:

The cell broadcasts an identifying signature or waveform, which can be seen as a "fingerprint", that the UEs use both as time and frequency reference, as well as to identify cells. Each waveform is identified by a Physical Cell Identity (PCI). These identifying signatures are not unique (e.g., there are 504 different PCIs in LTE), and can therefore not be used to uniquely identify a neighbor cell. In addition, each cell broadcasts as part of the system information a globally unique cell identifier (CGI).

The eNBs each maintain a neighbor relation table (NRT) for their respective cell. In general, each entry contains everything the eNB needs to know about a neighbor. Traditionally, NRTs have been populated using cell planning tools by means of coverage predictions before the installation of a eNB. Prediction errors, due to imperfections in map and building data, have necessitated that operators perform drive/walk tests to completely exhaust the coverage region and identify all handover regions. This is significantly simplified in LTE, which features the UE ANR (User Equipment Automatic Neighbor Relations) function, which means that UEs shall decode and report the CGI information of neighbor cells to the serving cell upon request. It is the CGI that the eNB uses when signaling to another eNB via the MME, since the MME routes the messages based on eNB identity which is a part of CGI.

If the policy is to establish X2 for neighbor relations and if X2 is not already available, then CGI can be used to recover the target eNB IP address (3GPP TS 36.413), which is used for X2 setup. When the X2 interface (3GPP TS 36.423) is established, the eNBs can share information about their served cells including PCIs and CGIs. Furthermore, they can share load information (3GPP TS 36.423, sections 8.3.1 and 9.1.2.1) to inform each other about the current cell load situation, for example to support interference management.

Such load information from an eNB with respect to a specific served cell may include an UL interference overload indication to inform about the interference situation at the eNB receiver with respect to a served cell and for different frequency resources, in particular to inform about high uplink interference.

The load information may also include an uplink high interference indication to inform about potentially high induced interference at a target cell and at indicated frequency resources. This is typically used when a UE served by a first cell reports a second cell as a candidate cell to inform the eNB serving the second cell that it may experience rather high uplink interference at the frequency resources where the UE is allocated.

Random Access

The random access (RA) serves as an uplink control procedure to enable the UE to access the network. The RA procedure serves two main purposes. First, the RA procedure lets the UE align its UL timing to that expected by the eNB in order to minimize interfering with other UEs transmissions. UL time alignment is a requirement in E-UTRAN before data transmissions can commence. Second, the RA procedure provides an ability for the UE to notify the network of its presence and enables the eNB to give the UE initial access to the system. In addition to the usage during initial access, the RA will also be used when the UE has lost the uplink synchronization or when the UE is in an idle or a low-power mode.

FIG. 2 illustrates the primary four operation/method steps/phases of a RA procedure. Step 1 includes transmitting a random access preamble from a UE 200 to a eNB 100, which enables the eNB 100 to estimate the transmission timing of the UE 200. Uplink synchronization is necessary as the UE otherwise cannot transmit any uplink data.

To generate the random access preamble, the UE 200 obtains information about which preambles are available (either to select one at random or to use a specified one), whether one or repeated preambles should be used, what the desired received power level should be at the eNB 100, what power increase step that should be used in case of failed preamble reception, what the maximum number of random access preamble transmission is, when it is allowed to transmit the preamble, etc.

When the UE 200 obtains the Phase I information via dedicated signaling, such as random access as part of handover (the dedicated signaling originated from the target cell, forwarded to the UE 200 by the serving cell), a specific preamble may be configured. In addition, a designated timer T304 is started with a value provided by the dedicated signaling.

Step 2 (FIG. 2) includes the eNB 100 transmitting a random access response, such as a timing advance command to the UE 200 to cause correction of the uplink timing, based on the timing of arrival measurement in Step 1. In addition to establishing uplink synchronization, the Step 2 also assigns uplink resources and temporary identifier to the UE 200 to be used in a subsequent Step 3 in the RA procedure.

The UE 200 monitors a Packet Data Control CHannel (PDCCH) of the cell for random access response in the RA response window, which starts at the subframe that contains the end of the preamble transmission plus three subframes and has the length ra-ResponseWindowSize.

If no response has been received, and the max number of preamble transmissions has been reached, or the timer T304 has expired, the handover attempt is considered failed and higher layer is informed. Then, the UE 200 initiates the RRC connection reestablishment procedure to restore the connection to the source cell, specifying the reestablishment cause to handover failure. Furthermore, a radio link failure report is prepared.

Step 3 (FIG. 2) includes the UE 200 transmitting message signalling to the eNB 100. A primary function of this message is to uniquely identify the UE 200. The exact content of this signalling depends on the state of the UE 200, e.g., whether it is previously known to the eNB 100 or not.

Step 4 (FIG. 2) includes contention resolution in case multiple UEs 200 have attempted to access the system on the same resource. In case of handover, the target eNB 100" may signal random access information to the source eNB 100', which will further convey that information to the UE 200. This information may comprise a reserved RA preamble for unique identification already at Phase 2. This is known as contention free random access.

Channel Sounding

Sounding resources are used to transmit reference symbols over the entire or parts of the uplink bandwidth. By transmitting uplink sounding reference signals, the UE 200 can provide the eNB 100 with information about uplink channel quality. This information can be utilized e.g. for uplink channel dependent scheduling, uplink link adaptation, and also for downlink beam forming in case of reciprocal channels as in time division duplex (TDD). The sounding reference signals are transmitted on the last symbol in the subframe. Several UEs 200 can transmit sounding in the same subframe. This is made possible by assigning a set of sounding reference signals to each cell, preferably such that these signals are locally unique in the sense that no other cell in the vicinity is assigned the same sounding reference signals.

Multiple Carriers and Carrier Aggregation

In 3GPP LTE, a cell is associated with a downlink and optionally an uplink carrier, as well as a coverage area. If the operator has license for more than one LTE carrier, then the eNB 100 can configure multiple cells, each assigned a different carrier. Then, the eNB 100 may (re)allocate UEs 200 to different carriers depending on their service needs and the available capacity per carrier in the network. The allocation mechanism is essentially the intra-site handover mechanism.

An alternative is carrier aggregation, where the UE 200 is assigned a primary component carrier and zero or more secondary component carriers to enable service over wide bandwidths. It is thereby possible to (re)assign the frequency resources over the available component carriers in the scheduler.

FIGS. 3A-3B illustrate example frequency resource assignment operations and methods. Referring to FIG. 3A, the UE 200 is assigned frequency resources one carrier at a time out a plurality of available carriers. Referring to FIG. 3B, a plurality of carriers are aggregation for simultaneous use by the UE 200, were the frequency resource allocation can span all available carriers.

Network Management Architecture

In addition to the user and control planes specified in 3GPP, there is architecture for network management to support configuration, equipment management, fault management, performance management, etc.

FIG. 4 illustrates a block diagram of an example management system. The node elements (NE) 402, also referred to as eNBs, are managed by a domain manager (DM) 400',400", also referred to as the operation and support system (OSS). Sometimes the individual elements (eNBs) 100',100" are considered handled by an element manager (EM), which is a part of the DM 400',400". Typically, a DM manages only equipment from the same vendor. The DM 400',400" tasks include configurations of the network elements, fault management and performance monitoring. The latter can mean that extensive data from events and counters is regularly transferred from the network elements up to the DM 400', 400".

The DM 400',400" may further be managed by a network manager (NM) 402 via Itf-N. Two NEs 100',100" are interfaced by X2, whereas the interface between two DMs 400', 400" is referred to as Itf-P2P. This means that multi-vendor management can be handled either via the common NM 402 and the interface Itf-N, or via the peer-to-peer interface Itf-P2P. Furthermore, the X2 interface between eNBs 100',100" also supports some management. Moreover, this interface is standardized and therefore works between eNBs from different vendors.

Heterogeneous Networks

In a cellular network there will often be areas with high traffic, i.e. high concentration of users. In those areas it would be desirable to deploy additional capacity to ensure user satisfaction. The added capacity could then be in the form of additional high power (macro) base station or to deploy nodes with lower output power and thus covering a smaller area in order to concentrate the capacity boost on a smaller area There will also be areas with bad coverage where there is a need for coverage extension, and again one way to do that is to deploy a node with low output power to concentrate the coverage boost in a small area.

One argument for choosing nodes with lower output power in the above cases is that the impact on the high power (macro) network can be minimized, e.g. it is a smaller area where the high power (macro) network may experience interference.

Currently there is a strong drive in the industry in the direction towards the use of low power nodes. The different terms used for this type of network deployments are Heterogeneous networks, multilayer networks or shortly HetNets.

FIG. 5 illustrates a high power (macro) base station (the illustrated high tower) which provides a wide area coverage (also called macro cell). It also shows low power nodes that are deployed to provide small area capacity/coverage. In this example pico base stations, relays and home base stations (femto cells) are shown. Although the figure shows clusters of femto cells, single cell deployments may also exist.

When a UE served by a high power (macro) base station is closely spaced to a femto base station, possibly with restricted access, then the femto base station may induce significant downlink interference to the UE. One mechanism to avoid this is via two carriers $f_1$ and $f_2$ available at the high power (macro) base station, and only carrier $f_2$ available at the femto based station as in FIG. 6. UEs served by the high power (macro) base station at carrier $f_2$ and interfered in the downlink at carrier $f_2$ are handed over to carrier $f_1$. The carrier $f_1$ is sometimes referred to as an escape carrier.

In a similar solution, UEs served by the high power (macro) base station can aggregate the primary component carrier $f_1$ with the secondary component carrier $f_2$ if the latter is not interfered by the femto base station in which case the UE operates only on the primary component carrier $f_1$. Nevertheless, the secondary carrier allocated to the UE could be free from interference from the femto base station, but its use could cause high interference to the femto base station cell.

Known approaches to overcoming the above disadvantages suffer from several drawbacks. Specifically, cell and carrier selection is based on downlink reference signal measurements by the UE. This means that the assigned carriers consist of the most appropriate choice (from a radio efficiency point of view) relevant for the downlink, but not necessarily for the uplink. Furthermore, detailed uplink interference coordination via the UL high interference indication is driven by the knowledge that a particular UE may interfere with a specific second cell. However, it is not always possible to identify this interference relation based on downlink measurements. In heterogeneous networks, it is possible that a UE served by a high power (macro) eNB may induce significant interference to a low power base station even without detecting the downlink from the low power base station.

The approaches and presently recognized problems described above in this section could be pursued, but are not necessarily approaches and/or problems that have been previously conceived or pursued. Therefore, unless otherwise clearly indicated herein, the approaches and problems described above in this section are not prior art to claims in any application claiming priority from this application and are not admitted to be prior art by inclusion in this section.

SUMMARY

One embodiment of the present invention is directed to a method that can be performed in at least one network node which provides wireless communications service for user equipment nodes, UEs. The method includes detecting uplink interference at an interfered network node. Responsive to the uplink interference, an uplink transmission having a defined configuration is initiated from a UE, which is served by a serving network node. The uplink signal is detected using the defined configuration at the interfered network node. The UE is identified responsive to the detected uplink signal as being a contributor to the uplink interference. An uplink transmission by the UE and/or by another UE served by the serving network node is controlled to reduce uplink interference.

Accordingly, the problems described above may be overcome because the particular UE(s) which is causing interference to a network node is identified using uplink transmissions from the UE(s). Those particular UE(s) can then be controlled to reduce uplink interference to the network node. In this manner, the source of particular interference can be identified and managed, which may allow reduced interference between overlapping cells and/or more efficient frequency reuse between overlapping cells.

In some further embodiments, the serving network node and/or the interfered network node may define the configuration of the uplink signal to be transmitted by the UE. The uplink signal configuration may define a frequency, a timing, and/or a signal code that is to be used by the UE when transmitting the uplink signal. The interfered network node can then attempt to detect the uplink signal, when transmitted by the UE, using the defined frequency, timing, and/or signal code identified by the uplink configuration message. The UE may be controlled to transmit the uplink signal as a sounding signal, a random access preamble, and/or a demodulated reference signal for detection by the interfered network node.

In some further embodiments, further interference to the interfered network node can be avoided by controlling the UE to avoid use of one or more frequencies that have been identified as causing interference to the interfered network node, selecting among available frequencies for aggregated use by the UE for uplink transmission without selecting the identified one or more interfered frequencies, and/or coordinating between the serving network node and the interfered network node a schedule of uplink transmissions by the UE.

Another embodiment of the present invention is directed to a first network node, such as a serving network node, of a wireless communications network. The first network node includes a network interface, at least one transceiver, and a processor. The network interface is configured to communicate with a second network node. The transceiver is configured to communicate with a UE. The processor is configured to receive an interference message from the second network node reporting uplink interference detected by the second network node, and to initiate transmission by the UE of an uplink signal having a defined configuration, responsive to the interference message. The processor receives an uplink signal message from the second network node reporting receipt of the uplink signal transmitted by the UE, and identifies the UE responsive to the uplink signal message as being a contributor to the uplink interference. The processor controls uplink transmission by the UE and/or another UE communicating with the at least one transceiver to reduce uplink interference.

Another embodiment of the present invention is directed to a first network node, such as an interfered network node, of a wireless communications network. The first network node includes a network interface, at least one transceiver, and a processor. The network interface is configured to communicate with a second network node. The transceiver is configured to communicate with a UE. The processor is configured to detect uplink interference in a signal received by the transceiver, and to communicate an interference message to the second network node reporting the uplink interference that has been detected. The processor detects an uplink signal having a defined configuration transmitted by a UE, and communicates an uplink signal message to the second network node reporting receipt of the uplink signal transmitted by the UE.

Other methods and network nodes according to embodiments of the invention will be or become apparent to one with skill in the art upon review of the following drawings and detailed description. It is intended that all such additional methods and network nodes be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 2 is a diagram of operations, methods, and associated message flows between a UE and a network node to perform some steps of a random access procedure;

FIGS. 3A-3B illustrate example frequency resource assignment operations and methods;

FIGS. 11-21 are flowchart of operations and methods performed in at least one network node in accordance with various embodiments of the present invention;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The following example embodiments provide a number of advantages and benefits relative to existing systems and methods for managing uplink interference by a UE to a network node. It will be appreciated by those skilled in the art in view of the present description, however, that the invention is not limited to these embodiments which produce any or all of these advantages or benefits and that other advantages and benefits may be realized depending upon the particular implementation.

Various embodiments of the present invention are directed to using channel sounding to identify uplink interferers served by other cells. In at least some embodiments, for example, the information about channel sounding configurations is shared peer to peer between network nodes (eNBs or base stations). When an uplink interferer has been identified, this information is conveyed to its serving network node which then reduces its interference by avoiding use of one or several carriers, or by indicating the intended frequency resource allocation of the interfering UE to the interfered network node. In accordance with at least some embodiments, the terms "channel sounding" and "uplink signal" are interchangeable in the present detailed description.

It is possible in a HetNet environment that a UE can cause uplink interference to a cell without being able to detect that cell reference signal. In such conditions it is difficult for the network node serving the UE to understand which UE is causing interference and therefore how to adjust allocation of secondary carriers.

Figure 7:
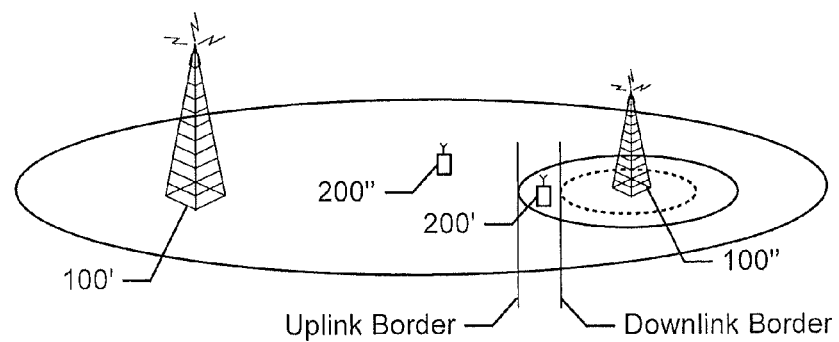
FIG. 7 illustrates a low power base station cell that is embedded within a cell of a high power base station.

The following description includes two primary parts, where the first part discusses mechanisms to identify uplink interferers and the second part discusses actions to take following the identification. The considered scenario is a low power base station embedded in the coverage area of a cell served by a high power (macro) base station as illustrated by FIG. 7. As used herein, "high power" and "low power" refers to relatively greater and lesser amounts of power and is not to be interpreted as providing any particular level of transmission power. Referring to FIG. 7, a low power base station 100" is located within the coverage area of a cell served by a high power base station 100'. It is noted that different downlink power levels cause an uplink (UL) and downlink (DL) imbalance. The UE 200' located in the overlapping cell coverage areas may be particularly prone to cause unacceptable uplink interference to the low power base station 100", in contrast to another UE 200" located outside the cover area of the low power base station 100". This description can be extended to a more general case with many partly overlapping cells.

Figure 8:
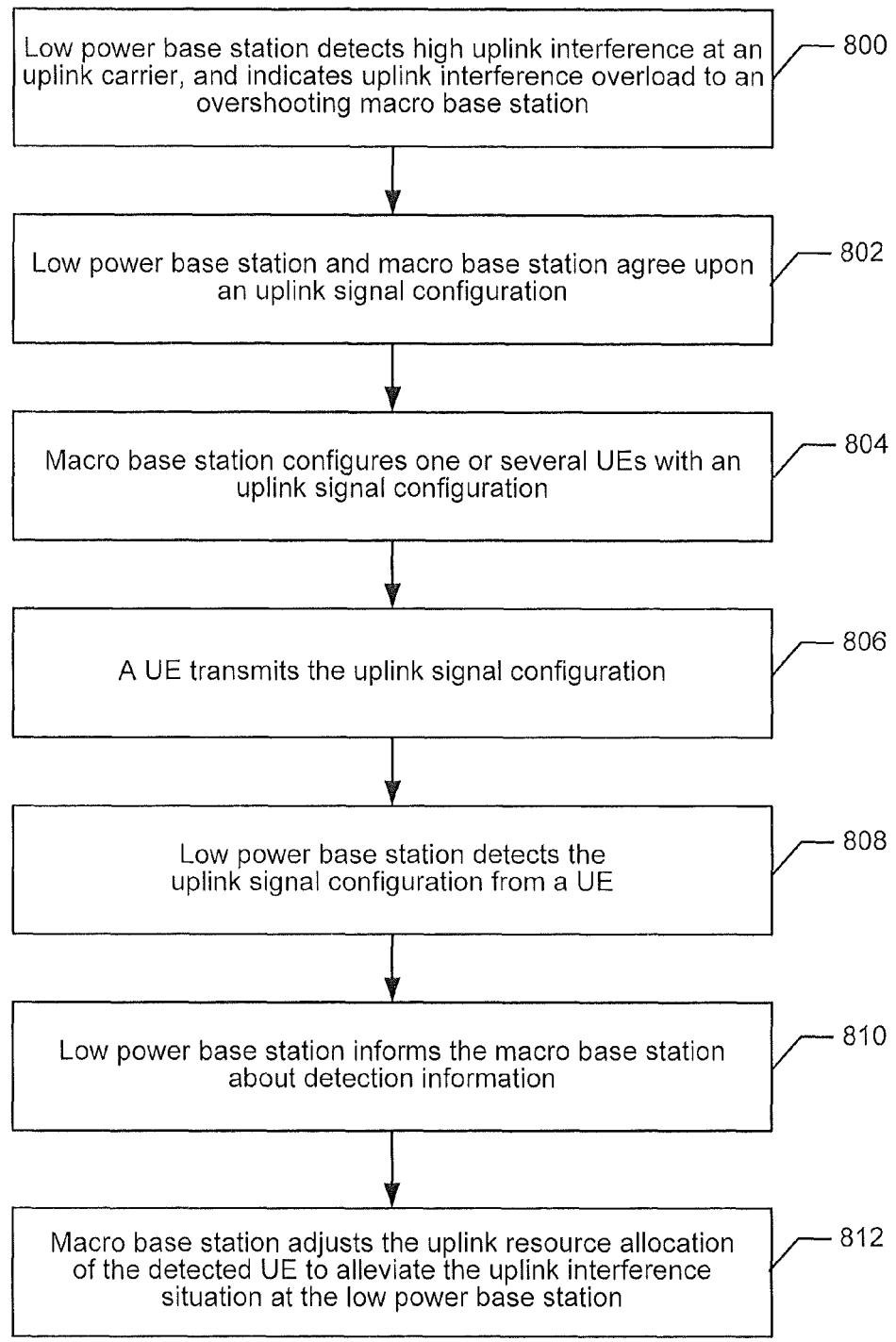
FIG. 8 is a flowchart of operations and methods by which one or more UEs which are served by a high power base station are identified as causing interference to a low power base station.
Figure 9:
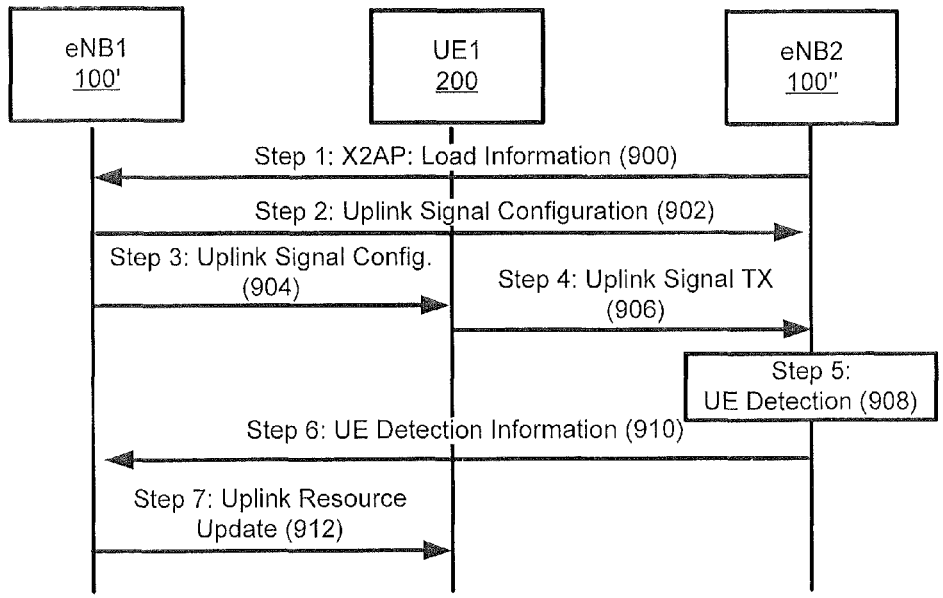
FIGS. 9 and 10 are a signal flow diagrams that illustrates further operations and methods associated with those illustrated in FIG. 8.

FIG. 8 is a flowchart of operations and methods by which one or more UEs which are served by a high power base station are identified as causing interference to a low power base station. FIG. 9 is a signal flow diagram that illustrates further operations and methods associated with those illustrated in FIG. 8.

Referring to FIGS. 8 and 9, the low power base station (eNB2, 100") detects (block 800) high uplink interference at a specific carrier, and assumes that the induced interference is from a UE served by the high power base station (eNB1, 100'). The low power base station (eNB2, 100") responds thereto by communicating (flow 900) an uplink interference overload using a load information message over an X2 interface to the high power base station (eNB1, 100').

However, the high power base station (eNB1, 100') may not have any information allowing a determination about which of the plurality of served UEs, if any, is inducing the interference to the low power base station (eNB2, 100"). Therefore, the low power base station (eNB2, 100") and high power base station (eNB1, 100') agree (block 802) upon an uplink signal configuration that can be transmitted by one or more UEs, receivable by the low power base station (eNB2, 100"), for whichever UEs are within range, and used to identify the corresponding UEs.

In some embodiments, the high power base station (eNB1, 100') determines a configuration for the uplink signal(s) that are to be transmitted by the UE(s) to have a defined signal timing, frequency, and/or code. The high power base station (eNB1, 100') configures (block 804, flow 904) the selected UE(s) to transmit the uplink signal with the defined configuration.

When selecting which of the UE(s) services are to be configured for transmission of the uplink signal, the high power base station (eNB1, 100') preferably restricts the selection to the UE(s) generating interference. In order to restrict the number of UE(s) to only the interfering ones the high power base station (eNB1, 100') may take into consideration the following: 1) neighbor cells reported by the low power base station (eNB2, 100") in the X2 setup messages; 2) neighbor cells reported by the UE(s) served by the high power base station (eNB1, 100'). The UE(s) reporting cells that are also neighbors of the low power base station (eNB2, 100") are more likely to be the interference sources and shall be selected for the uplink signal configuration.

In one embodiment, the high power base station (eNB1, 100') initiates the uplink signal configuration only for served UEs that were scheduled to use the indicated overloaded uplink frequency resources in the Load Information message. The uplink signal configuration may be pre-determined by the O&M (Operations & Maintenance) system for use by the high power base station (eNB1, 100'), where the uplink signal configuration may be defined solely for, at least partially for, the intended use of interferer identification.

In one embodiment, the uplink signal configuration is used only for the purpose of interferer identification, and is not otherwise used to configuration an uplink signal from a UE. For example, when the low power base station (eNB2, 100") reserves an uplink signal configuration for interferer identification, then the same uplink signal configuration is not allocated to adjacent base stations for use by served UEs.

In one embodiment, where there are multiple candidate base stations that may be serving the interfering UE, the low power base station (eNB2, 100") signals the load Information to all candidate base stations.

Before the selected UE(s) transmit the uplink signal(s), the high power base station (eNB1, 100') signals (block 806, flow 902) the uplink signal configuration to the low power base station (eNB2, 100") so that it can initiate detection mechanisms to attempt to receive (detect) the uplink signal(s) from the selected UE(s).

The selected UE(s) transmits the uplink signal configuration (block 806, flow 906), which may be detected by the low power base station (eNB2, 100"). In the example of FIGS. 8 and 9, the low power base station (eNB2, 100") detects (block 808, block 908) the uplink signal from one of the UEs.

The low power base station (eNB2, 100") communicates (block 810, flow 910) detection information, possibly including timing and frequency resource information which was associated with detecting the uplink signal, to the high power base station (eNB1, 100'). The high power base station (eNB1, 100') uses the detection information to identify the interfering UE. The high power base station (eNB1, 100') responds to that identification by adjusting (block 812, flow 912) the uplink resource allocation of the identified UE to alleviate the uplink interference situation at the low power base station (eNB2, 100"), such as using one or more of the methods and operations described below.

Figure 10:
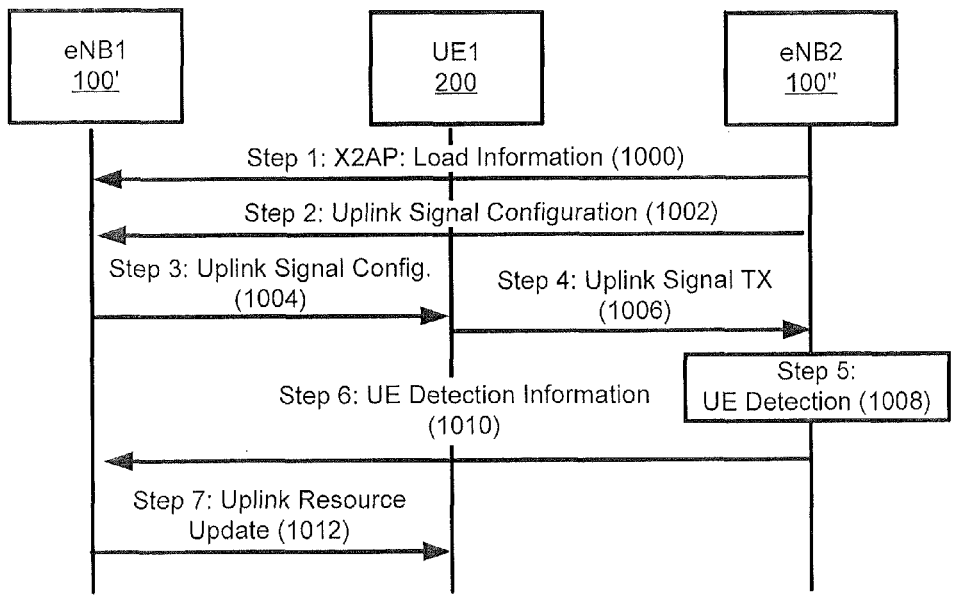

FIG. 10 is a signal flow diagram that illustrates operations and methods that are similar to those described above of FIG. 9, except that in FIG. 10 the low power base station (eNB2, 100") responds to detection of high uplink interference at a specific carrier, by determining the uplink signal configuration that is to be transmitted by one or more UEs, and communicates the uplink interference overload message (flow 900) and the uplink signal configuration (flow 902) to the high power base station (eNB1, 100'). The illustrated flows 900 and 902 may be carried out by a signal message flow or by any other number of signal message flows.

The other message flows 1004, 1006, 1010, and 1012 may be performed by the operations and methods described above regarding FIGS. 8 and 9 for flows 904, 906, 910, and 912, respectively.

In another embodiment, the uplink signal configuration is defined for a limited time and frequency span, but can be used within a time window and/or within a frequency window which are larger than the uplink signal configuration. Thereby, the high power base station (eNB1, 100') can assign the uplink signal configuration to multiple UEs but with different time and/or frequency offsets. Thereby, the timing and frequency offset can be included in the detection information from the low power base station (eNB2, 100"), which in turn means that the high power base station (eNB1, 100') can determine the interfering UE among the multitude of UEs.

In another embodiment, the uplink signal information in FIG. 10 is included in the load information message.

Uplink Signal can be an Uplink Channel Sounding Signal

As explained above, the uplink signal can transmitted by a UE as a channel sounding signal that may be configured by the high power base station (eNB1, 100'), although it may alternatively or additionally be configured by the low power base station (eNB2, 100"). Accordingly, the uplink signal configuration may be defined as an uplink channel sounding configuration. The low power base station (eNB2, 100") may included a dedicated controller (processor) circuit or multi-functional controller circuit configured to search for the uplink channel sounding signal. The uplink channel sounding signal may be detected based on it being transmitted at a defined time, at a defined frequency/frequency range, and/or with a defined code.

Uplink Signal can be a Random Access Preamble

In another embodiment, the uplink signal can transmitted by a UE as a random access preamble signal that may preferably be configured by the low power base station (eNB2, 100"), although it may alternatively or additionally be configured by the high power base station (eNB1, 100'). Accordingly, the uplink signal configuration may be defined as a random access preamble configuration. The random access preamble signal may be searched for using a controller configured is a conventional manner to search for random access preamble signals.

The random access preamble configuration can be controlled responsive to mobility control information intended for handover purposes. The mobility control information may be used as-is to control configuration of the random access preamble used for uplink signal detection. Alternatively, the mobility control information may be tailored to facilitate the purpose of uplink signal detection by, for example:

1) configuring a low max number of preamble transmissions, for example 1 or 2;

2) reserving a specific preamble for use in detection of an uplink signal from one or more possible UE interferers; and/or 3) configuring a short expiration timer, after which the handover is considered as failed (e.g. in LTE this timer is denoted T304).

The random access procedure for mobility can be modified to facilitate identification of a UE causing uplink interference by, for example:

1) indicating a cause "uplink interferer identification" or similar as part of the mobility control information which is used to define the random access;

2) configuring the random access to use a time window when the UE is not transmitting in DRX (discontinuous reception) to avoid conflicts with ongoing transmissions;

3) controlling the UE to not listen for the random access response, and instead initiate re-establishment to the high power base station (eNB1, 100');

3) controlling the low power base station (eNB2, 100") to not respond to the random access preamble associated with the uplink interferer identification;

4) controlling the low power base station (eNB2, 100") to use a different random access power control for random access transmissions, for example to use a different power increase step at failed random access preamble reception;

5) controlling a UE to not include the handover failure associated with the uplink interferer identification mechanism in a radio link failure report;

6) controlling a UE to not discontinue ongoing radio bearers while transmitting the RA preamble; and/or 7) controlling a UE to complete the connection to the low power base station (eNB2, 100") when a successful attempt is made.

The random access procedure can be further modified to not require the mobile to synchronize to the low power base station before transmitting the random access preamble. Related adjustments to the random access procedure can be made for the purpose of uplink interferer identification, such as, for example, the high power base station can:

1) configure the mobile to use a random access preamble transmission power that is related to the observed radio conditions from the high power base station;

2) configure the mobile to use a random access preamble transmission time instant related to the received downlink of the high power base station; and/or 3) configure the mobile to use a random access with respect to the high power base station.

Further to these examples, the low power base station may implement dedicated detection mechanisms for uplink interferer identification, such as, for example, by configuring the random access receiver procedure to search for random access preambles at any time, any possible frequency resource, any possible code resource, not only at the time intervals, and/or frequency resources and/or code resource associated to the random access procedure configured for users served by the low power base station.

Uplink Signal can be a Demodulation Reference Signal

In another embodiment, the uplink signal can transmitted by a UE as a demodulation reference signal that the UE embeds with data during uplink data transmission.

Uplink Signal can be a Scheduling Allocation

In another embodiment, the uplink signal can be a scheduling allocation, which indicates where in time and frequency the UE can send uplink data. The operations and methods performed by the low power base station (eNB2, 100") to detect the uplink signal can include identifying where in frequency and time a high level (e.g., at least a threshold level or at least a threshold level of increase) the uplink interference occurs. This information is communicated to the high power base station (eNB1, 100') where it is used together with information about prior scheduling allocations to identify the interfering UE from a among a plurality of UEs served by the high power base station (eNB1, 100').

Further Embodiments

Although various embodiments have been described in the context of operations and methods that are performed by a high power base station and a low power base station, they are not limited to use with heterogeneous networks. Instead, the embodiments described herein may be carried out by any type of type or more base stations (network nodes) to facilitate identification of a source of uplink interference to one of the base stations by a UE that is being served by another base station. Further embodiments are described below with regard to the flowcharts of FIGS. 11-21 illustrating operations and methods which can be used in heterogeneous networks, homogenous networks, or other network configurations to control uplink interference.

Figure 11:
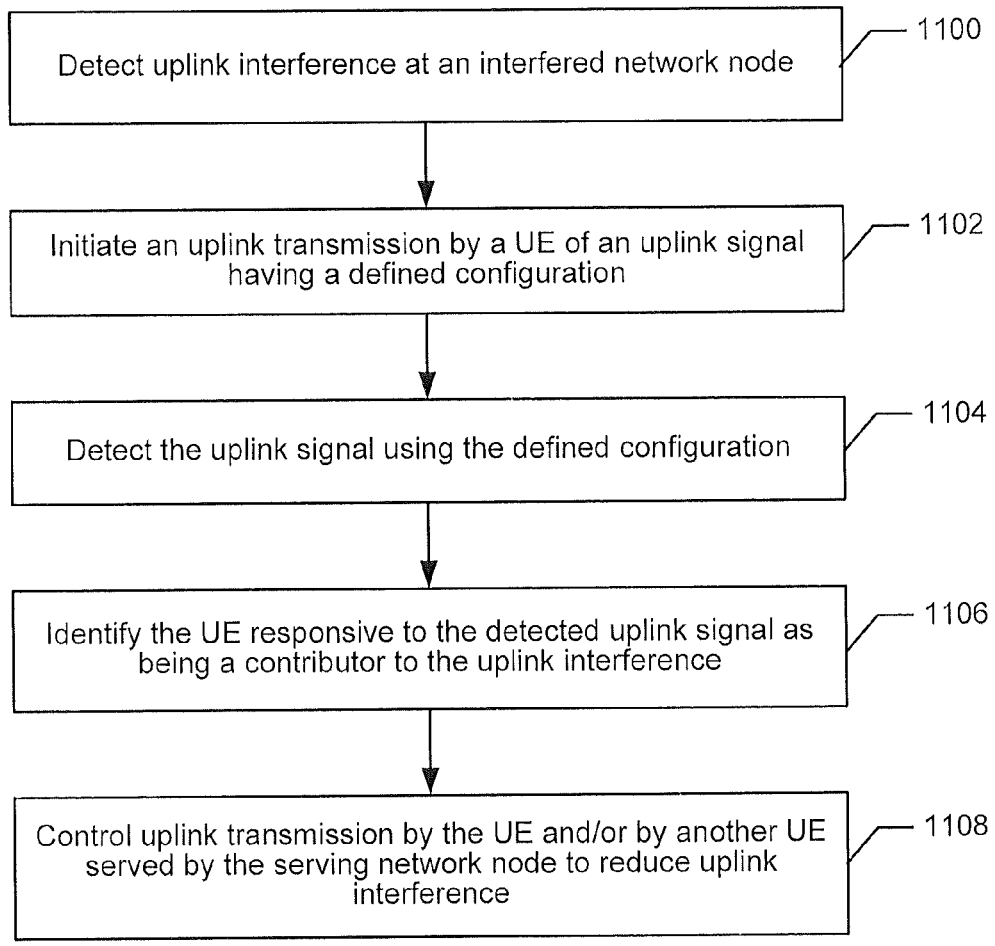

FIG. 11 is a flowchart of operations and methods performed in at least one network node 100',100" which provides wireless communications service for UEs 200. Referring to FIG. 11, uplink interference is detected (block 1100) at an interfered network node 100". Initiation of an uplink transmission by a UE 200', which is served by a serving network node 100', of an uplink signal having a defined configuration is triggered responsive to the uplink interference (block 1102). The uplink signal is detected (block 1104) using the defined configuration at the interfered network node 100". The UE 200' is identified (block 1106) responsive to the detected uplink signal as being a contributor to the uplink interference. The serving network node 100' and/or the interfered network node 100" may be configured to identify the UE 200' based on characteristics (e.g., signal timing, frequency, and/or code) of the detected uplink signal. Another uplink transmission by the UE 200' and/or by another UE served by the serving network node 100' is then controlled (block 1108) to reduce uplink interference.

Figure 12:
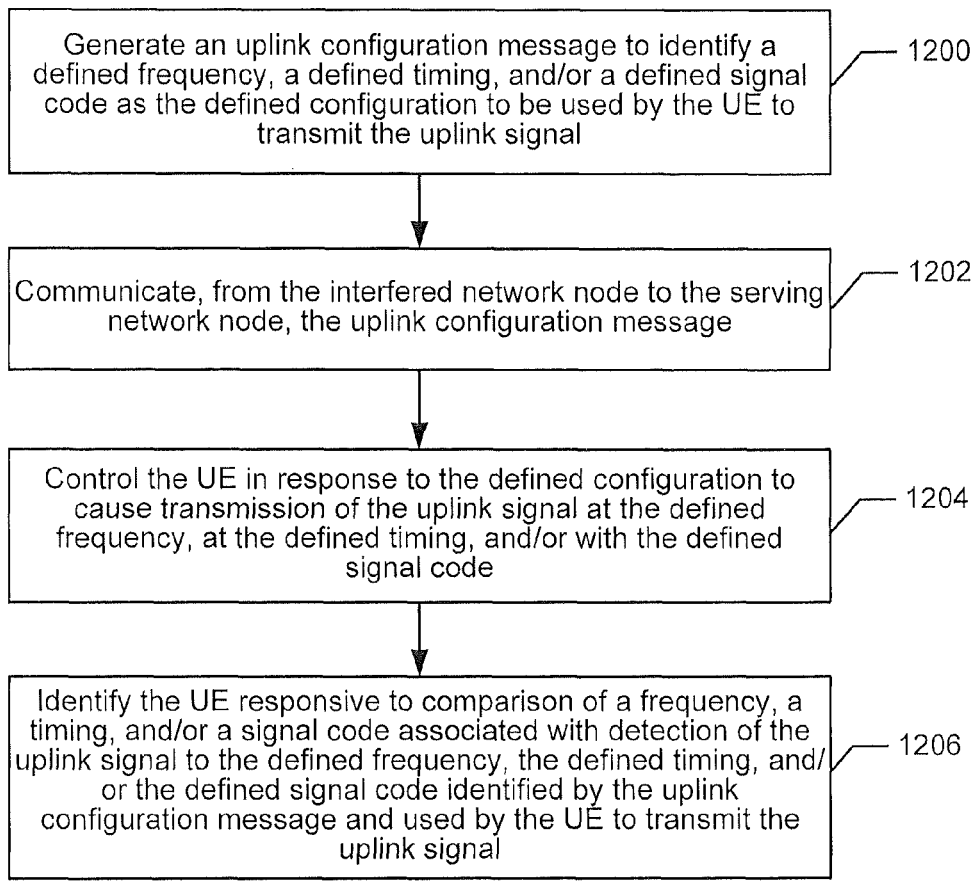

In one embodiment, the interfered network node 100" generates and communicates the uplink signal configuration to the serving network node 100' for use in controlling the UE 200'. Referring to FIG. 12, transmission of the uplink signal by the UE 200' can include having the interfered network node 100" generate (block 1200) the uplink configuration message to identify a defined frequency, a defined timing, and/or a defined signal code to be used by the UE 200' to transmit the uplink signal. The interfered network node 100" can then communicate (block 1202) to the serving network node 100' the uplink configuration message that identifies the defined configuration of the uplink signal to be transmitted by the UE 200'. The serving network node 100' responds to the defined configuration by controlling (block 1204) the UE 200' to cause transmission of the uplink signal at the defined frequency, at the defined timing, and/or with the defined signal code. The serving network node 100', the interfered network node 100" and/or another network node can identify (block 1206) the UE 200' responsive to comparison of a frequency, a timing, and/or a signal code associated with detection of the uplink signal to the defined frequency, the defined timing, and/or the defined signal code identified by the uplink configuration message and used by the UE 200' to transmit the uplink signal.

Figure 13:
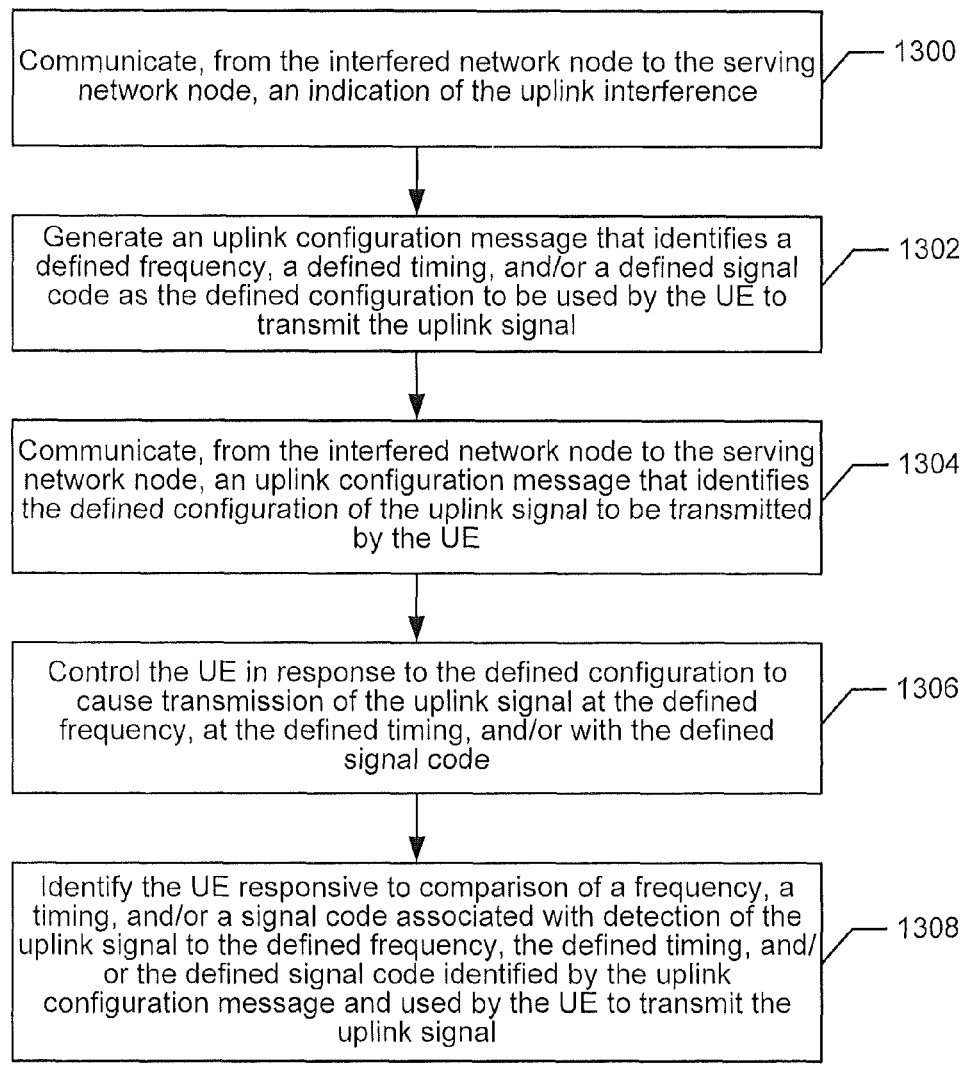

In another embodiment, the serving network node 100' generates and communicates the uplink signal configuration to the interfered network node 100" for use in attempting to detect the uplink signal transmitted by the UE 200'. Referring to FIG. 13, the interfered network node 100" communicates (block 1300) to the serving network node 100' an indication of the uplink interference. The serving network node 100' generates (block 1302) the uplink configuration message to identify a defined frequency, a defined timing, and/or a defined signal code to be used by the UE 200' to transmit the uplink signal. The serving network node 100' communicates (block 1304) to the interfered network node 100" an uplink configuration message that identifies the defined configuration of the uplink signal to be transmitted by the UE 200', which the interfered network node 100" can use to detected the uplink signal. The serving network node 100' controls (block 1306) the UE 200' in response to the defined configuration to cause transmission of the uplink signal at the defined frequency, at the defined timing, and/or with the defined signal code. The serving network node 100', the interfered network node 100" and/or another network node can identify (block 1308) the UE 200' responsive to comparison of a frequency, a timing, and/or a signal code associated with detection of the uplink signal to the defined frequency, the defined timing, and/or the defined signal code identified by the uplink configuration message and used by the UE 200' to transmit the uplink signal.

Figure 14:
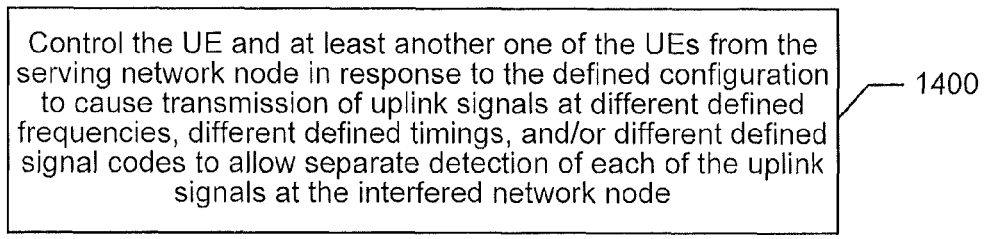
Figure 15:
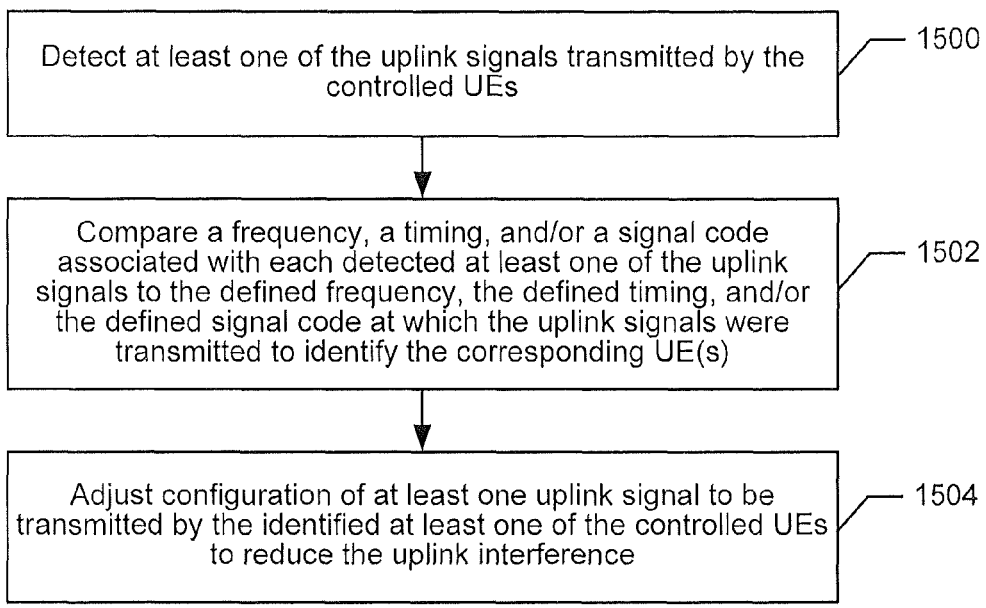

FIGS. 14 and 15 illustrate flowcharts of operations and methods which cause a plurality of UEs to transmit uplink signals that are used to identify one or more of the UEs that are interfering with the network node 100". Referring to FIG. 14, the serving network node 100' controls (block 1400) the UE 200' and at least another one of the UEs 200" in response to the defined configuration to cause transmission of uplink signals from the controlled UEs 200', 200" at different defined frequencies, different defined timings, and/or different defined signal codes to allow separate detection of each of the uplink signals at the interfered network node.

Referring to FIG. 15, the interfered network node detects (block 1500) at least one of the uplink signals transmitted by the controlled UEs 200', 200". The UE(s) corresponding to the detected uplink signal(s) are identified by comparing (block 1502) a frequency, a timing, and/or a signal code associated with each of the detected uplink signal(s) to the defined frequency, the defined timing, and/or the defined signal code at which the uplink signals were transmitted. Uplink interference to the interfered network node 100" is reduced by adjusting (block 1504) a configuration of at least one uplink signal to be transmitted by the identified at least one of the controlled UEs.

Figure 16:
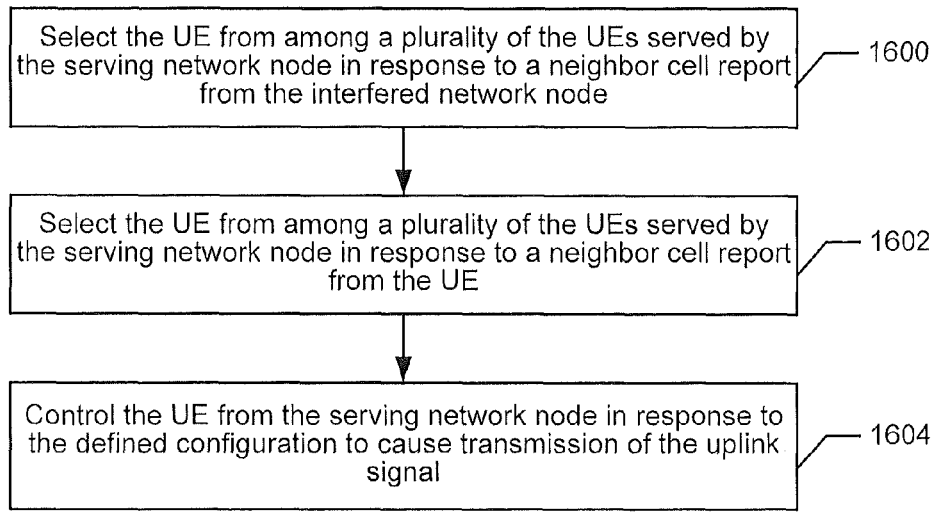

Various further embodiments are directed to how the serving network node 100' selects one or more UEs that may be causing interference to the interfered network node 100", and which will therefore used to transmit the uplink signal to confirm whether or not they are interfering. Referring to FIG. 16, wherein initiating the uplink transmission by the UE 200' of the uplink signal, the serving network node 100' may select (block 1600) the UE 200' from among a plurality of the UEs 200', 200" served by the serving network node 100' in response to a neighbour cell report generated by the interfered network node 100". Alternatively or additionally, the serving network node 100' may select (block 1602) the UE 200' from among the plurality of UEs 200', 200" in response a neighbour cell report from the UE 200'. The serving network node 100' controls (block 1604) the UE 200' in response to the defined configuration to cause transmission of the uplink signal.

As explained above and shown in FIG. 17, the serving network node 100' can control (block 1700) the UE 200' in response to the defined configuration to cause transmission of the uplink signal as a channel sounding signal.

As explained above and shown in FIG. 18, the uplink signal can be configured as a random access preamble. The serving network node 100' and/or the interfered network node 100" can define (block 1800) at least part of the random access preamble at the interfered network node 100". The serving network node 100' controls (block 1802) the UE 200' to cause transmission of the uplink signal with the random access preamble. The interfered network node 100" is aware that the UE 200' will be transmitting the random access preamble and detects (block 1804) receipt of at least part of the random access preamble.

The uplink signal that is transmitted by the UE 200' can be configured as a demodulated reference signal. Referring to FIG. 19, the serving network node 100' controls (block 1900) the UE 200' to cause transmission of a demodulated reference signal containing data generated responsive to the defined configuration. The interfered network node 100" is aware that the UE 200' will be transmitting the demodulated reference signal and detects receipt of the demodulated reference signal.

Uplink Resource Adjustment

Figure 6:
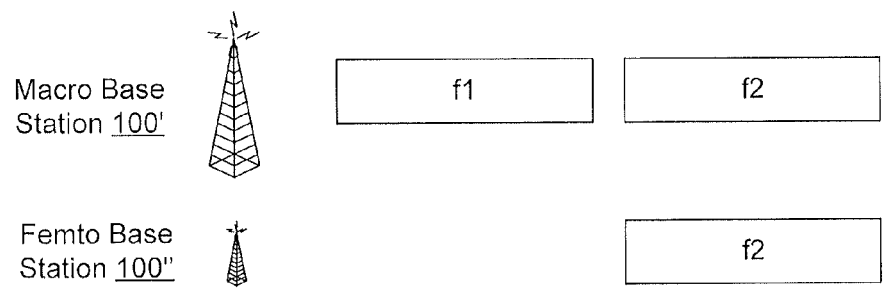
FIG. 6 illustrates frequencies used by the high base station and low power nodes to communicate with UEs and which may cause interference.

By way of non-limiting example, various operations and methods for controlling uplink transmissions by one or more UEs to reduce uplink interference to a low power base station (eNB2, 100") will now be explained. Referring again to FIG. 6, the high power base station (eNB1, 100') serves two cells operating at uplink carrier frequencies f1 and f2, respectively. The low power base station (eNB2, 100") serves a cell operating at uplink carrier f2. The operations and methods described above for one or more embodiments have been performed to identify a UE that is causing uplink interference to the low power base station (eNB2, 100"). Moreover, for this example, the uplink interference has been determined to be at a carrier frequency f2.

In accordance with various further embodiments, one or more of the following resource management actions can be used by the high power base station (eNB1, 100') to reduce uplink interference to the low power base station (eNB2, 100"), In one embodiment, the high power base station (eNB1, 100') changes the serving cell of the detected UE from the cell operating at carrier f2 to a cell operating at carrier f1.

In another embodiment, the high power base station (eNB1, 100') avoids aggregating the secondary uplink carrier f2 (where the UE is interfering with the low power base station (eNB2, 100")) to the detected UE. Instead, the UE is only allocated resources at carriers where the UE is not identified as an interferer to the low power base station (eNB2, 100"), which in the present example is carrier f1. In a similar embodiment, the high power base station (eNB1, 100') aggregating the secondary uplink carrier f2 (where the UE is interfering with the low power base station (eNB2, 100")), but using a lower transmission power, to the detected UE. In yet another similar embodiment, the high power base station (eNB1, 100') aggregating the secondary uplink carrier f2 (where the UE is interfering with the low power base station (eNB2, 100")), but using cross-scheduling to the detected UE from another uplink carrier to avoid control channel interference to the low power base station on the secondary uplink carrier.

In another embodiment, the high power base station (eNB1, 100') communicates, e.g. via UL High interference indication in a Load Information message over X2, the intended uplink resource allocation (typically band limited) for the detected UE on carrier f2.

In another embodiment, the high power base station (eNB1, 100') schedules the detected UE persistently and band limited in frequency for predictability on carrier f2. Consequently, the low power base station (eNB2, 100") can identify those bands and schedule cell edge users elsewhere.

In another embodiment, the high power base station (eNB1, 100') coordinates downlink transmission gaps such as almost blank subframes with the low power base station (eNB2, 100").

Figure 17:
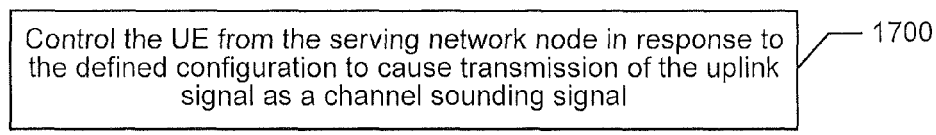
Figure 18:
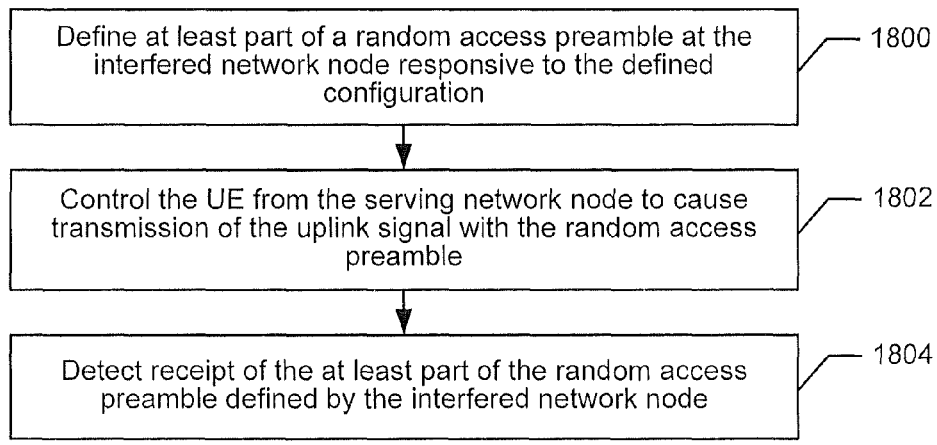

As explained above, these embodiments are not limited to use with heterogeneous networks, and may be used with homogenous or other types of networks. FIG. 20 is a flowchart of further operations and methods that can be used control uplink transmission by the UE 200' and/or another UE 200" served by a serving network node 100' to reduce uplink interference. Referring to FIG. 17, one or more interfered frequencies are identified (block 2000) as being used by the interfered network node 100" and which are interfered with by the uplink signal transmitted by the UE 200'. The serving network node 100' responds to the identification by controlling (block 2002) one or more frequencies used by the UE 200' and/or by the other UE 200" to avoid the identified one or more interfered frequencies. For example, the serving network node 100' can select among available frequencies for aggregated use by the UE 200',200" for uplink transmission without selecting the identified one or more interfered frequencies.

FIG. 21 illustrates an alternative or additional approach for reducing interference. Referring to FIG. 21, the serving network node 100' and the interfered network node 100" can coordinate (block 2100) a schedule of uplink transmissions for the UE 100'. The serving network node 100' can then control (block 2102) uplink transmission from the UE 200' responsive to the coordinated schedule.

The high power base station as well as the low power base station can summarize statistics about uplink interferer identification attempts, for example counting number of attempts and successful attempts. This statistics can be reported to an operation and maintenance node (400) or (402) of FIG. 4 on demand, regularly, or when a reporting condition is met. An operation and maintenance node (400) or (402) of FIG. 4 may also configure the reporting of statistics as well as configure the uplink interferer identification mechanism in the high and low power base stations respectively.

Example Network Node and User Equipment Node Configurations

Figure 1:
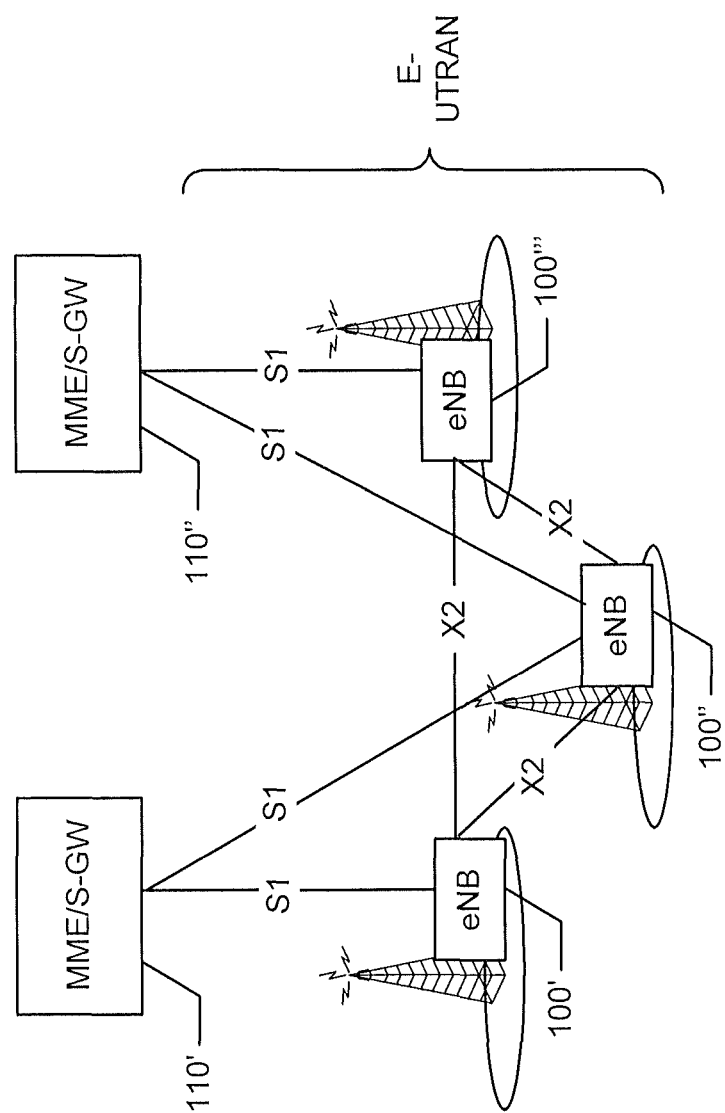
FIG. 1 is a block diagram of a communications system that can used with embodiments of the present invention.
Figure 4:
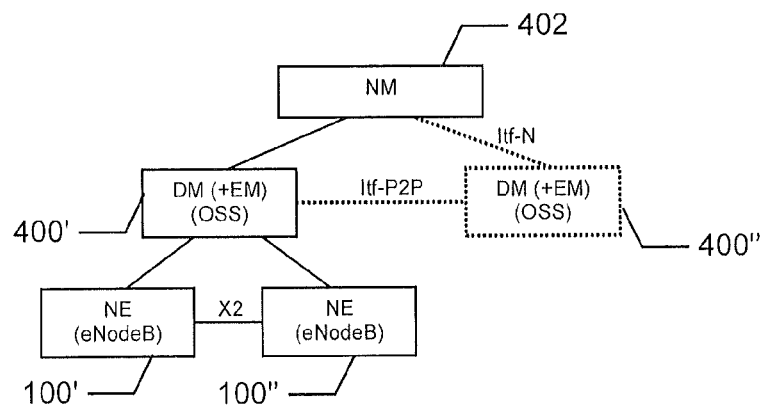
FIG. 4 illustrates a block diagram of example management nodes that may be used with the communications system of FIG. 1.
Figure 5:
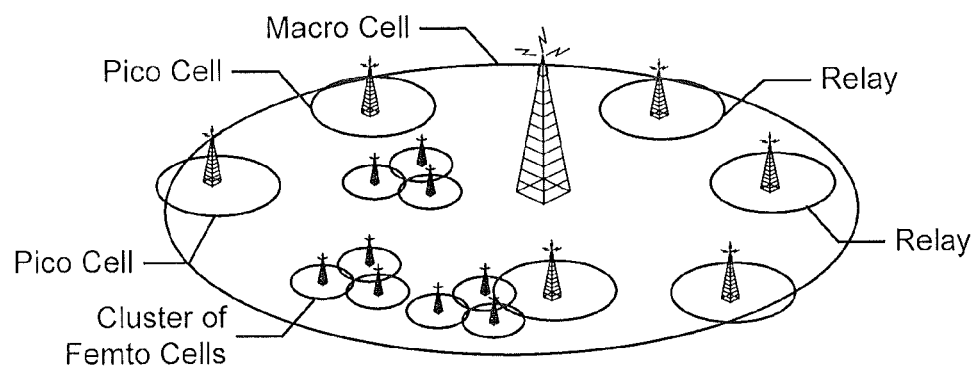
FIG. 5 illustrates a high power (macro) base station which provides a wide area coverage, and low power nodes that are deployed to provide small area capacity/coverage.
Figure 22:
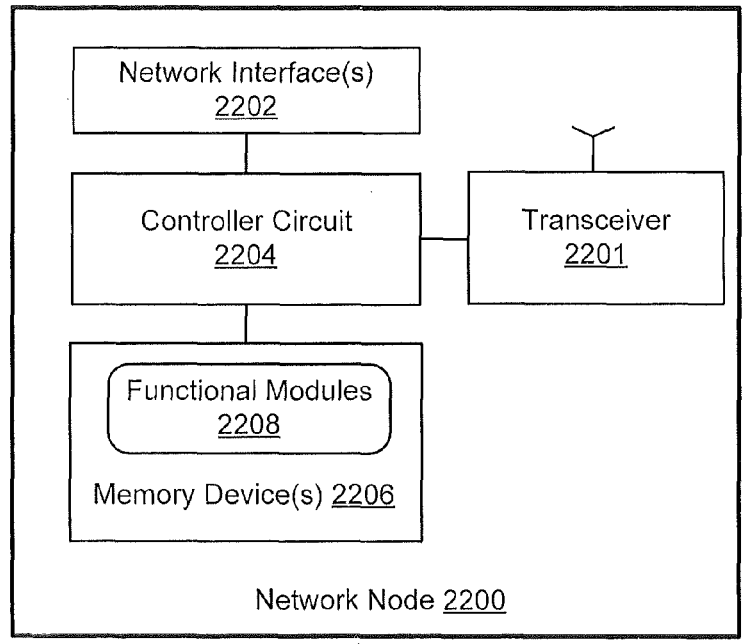
FIG. 22 is a block diagram of a network node configured according to some embodiments of the present invention.

FIG. 22 is a block diagram of a network node 2200 configured according to some embodiments of the present invention, and elements of which may be included in the base stations (eNB) 100, the MME/S-GW 110 and/or another network node of the system of FIG. 1 and/or another node of the system of FIG. 4. The network node 2200 includes a transceiver 2201, a network interface(s) 2202, a processor circuit 2204, and a memory device(s) 2206 containing functional modules 2208.

The transceiver 2201 (e.g., 3GPP compliant or other RF communication transceiver) is configured to communicate with one or more UEs or another node of the system 100. The processor 2204 may include one or more data processing circuits, such as a general purpose and/or special purpose processor (e.g., microprocessor and/or digital signal processor). The processor 2204 is configured to execute computer program instructions from the functional modules 2208 of the memory device(s) 2206, described below as a computer readable medium, to perform at least some of the operations and methods described herein as being performed by a base stations (eNB), a MME/S-GW and/or another network node in accordance with one or more embodiments of the present invention. The network interface 2202 communicates with the MME/S-GW (when located in a base station) or communicates with a base station (when located in the MME/S-GW).

Figure 23:
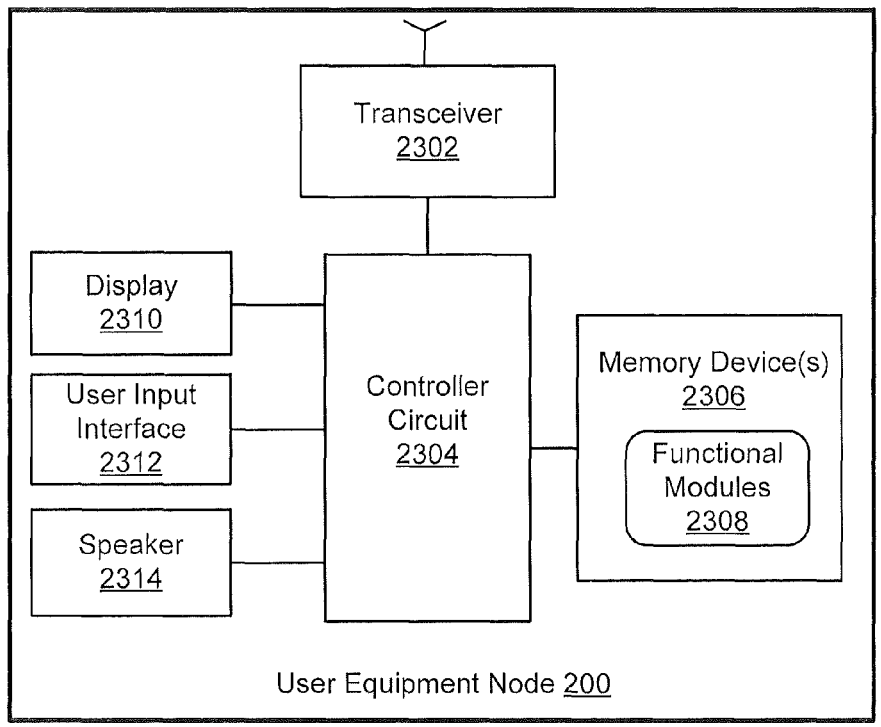
FIG. 23 is a block diagram of a UE that is configured according to some embodiments of the present invention.

FIG. 23 is a block diagram of the UE 200 described above and which is configured according to some embodiments of the present invention. The UE 200 includes a transceiver 2302, a processor circuit 2304, and a memory device(s) 2306 containing functional modules 2308. The UE 200 may further include other elements, such as a display 2310, a user input interface 2312, and a speaker 2314.

The transceiver 402 (e.g., 3GPP compliant or other RF communication transceiver) is configured to communicate with a base station (eNB) over a wireless communication interface. The processor 2304 may include one or more data processing circuits, such as a general purpose and/or special purpose processor (e.g., microprocessor and/or digital signal processor). The processor 2304 is configured to execute computer program instructions from the functional modules 2308 of the memory device(s) 2306, described below as a computer readable medium, to perform at least some of the operations and methods described herein as being performed by a UE in accordance with one or more embodiments of the present invention.

The UE 200 may be a mobile telephone ("cellular" telephone), a data terminal, and/or another processing device with wireless communication capability, such as, for example, a portable computer, a pocket computer, a hand-held computers, a laptop computers, an electronic book reader, and/or a video game console.

FURTHER DEFINITIONS

Some of the abbreviations used herein are defined below:
3GPP 3rd Generation Partnership Project
eNodeB E-UTRAN NodeB
eNB E-UTRAN NodeB
EPC Evolved Packet Core
E-UTRAN Evolved UTRAN
HeNB Home eNB
HeNB GW Home eNB Gateway
LTE Long Term Evolution
MME Mobility Management Entity
O&M Operation and Maintenance
PLMN Public Land Mobile Network
RAN Radio Access Network
RRC Radio Resource Control
S1 Interface between eNB and CN.
S1AP S1 Application Protocol
S1-MME Control Plane of S1.
UE User Equipment node
UTRAN Universal Terrestrial Radio Access Network
X2 Interface between eNBs When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network nodes, UEs, and/or methods according to embodiments of the invention will be or become apparent to one with skill in the art upon review of the present drawings and description. It is intended that all such additional network nodes, UEs, and/or methods be included within this description, be within the scope of the present invention, and be protected by the accompanying claims. Moreover, it is intended that all embodiments disclosed herein can be implemented separately or combined in any way and/or combination.

The invention claimed is:

1. A method in at least one network node which provides wireless communications service for user equipment nodes, UEs, the method comprising:
   detecting uplink interference at an interfered network node;
   initiating an uplink transmission by a UE, which is served by a serving network node, of an uplink signal having a defined configuration, responsive to the uplink interference, wherein initiating the uplink transmission by the UE of the uplink signal having the defined configuration comprises:
      communicating, from the interfered network node to the serving network node, an indication of the uplink interference;
      determining the defined configuration at the serving network node responsive to the indication of the uplink interference;
      communicating to the interfered network node an uplink configuration message that identifies the defined configuration of the uplink signal to be transmitted by the UE; and
      controlling the UE from the serving network node in response to the defined configuration to cause transmission of the uplink signal with the defined configuration;
   detecting the uplink signal using the defined configuration at the interfered network node;
   identifying the UE responsive to the detected uplink signal as being a contributor to the uplink interference; and
   controlling uplink transmission by the UE and/or by another UE served by the serving network node to reduce uplink interference.

2. The method of claim 1, further comprising:
   generating the uplink configuration message to identify a defined frequency, a defined timing, and/or a defined signal code to be used by the UE to transmit the uplink signal; and
   controlling the UE from the serving network node in response to the defined configuration to cause transmission of the uplink signal at the defined frequency, at the defined timing, and/or with the defined signal code.

3. The method of claim 2, wherein identifying the UE responsive to the detected uplink signal comprises:
   comparing a frequency, a timing, and/or a signal code associated with detection of the uplink signal to the defined frequency, the defined timing, and/or the defined signal code identified by the uplink configuration message and used by the UE to transmit the uplink signal.

4. The method of claim 1, wherein initiating the uplink transmission by the UE of the uplink signal having the defined configuration comprises:

selecting the UE from among a plurality of the UEs served by the serving network node in response to a neighbor cell report from the interfered network node.

5. The method of claim 1, wherein initiating the uplink transmission by the UE of the uplink signal having the defined configuration comprises:
selecting the UE from among a plurality of the UEs served by the serving network node in response to a neighbor cell report from the UE.

6. The method of claim 1, wherein initiating the uplink transmission by the UE of the uplink signal having the defined configuration comprises:
controlling the UE from the serving network node in response to the defined configuration to cause transmission of the uplink signal as a channel sounding signal.

7. The method of claim 1, wherein initiating the uplink transmission by the UE of the uplink signal having the defined configuration comprises:
controlling the UE from the serving network node to cause transmission of the uplink signal with a random access preamble generated responsive to the defined configuration.

8. The method of claim 7,
further comprising defining at least part of the random access preamble at the interfered network node, and
wherein detecting the uplink signal at the interfered network node comprises detecting receipt of at least part of the random access preamble defined by the interfered network node.

9. The method of claim 1, wherein initiating the uplink transmission by the UE of the uplink signal having the defined configuration comprises:
controlling the UE from the serving network node to cause transmission of a demodulated reference signal containing data generated responsive to the defined configuration.

10. The method of claim 1, wherein controlling uplink transmission by the UE and/or by the other UE served by the serving network node to reduce uplink interference comprises:
identifying one or more interfered frequencies used by the interfered network node that are interfered with by the uplink signal transmitted by the UE; and
controlling by the serving network node one or more frequencies used by the UE and/or by the other UE to avoid the identified one or more interfered frequencies.

11. The method of claim 10, wherein controlling uplink transmission by the UE and/or by the other UE served by the serving network node to reduce uplink interference comprises:
selecting among available frequencies for aggregated use by the UE for uplink transmission without selecting the identified one or more interfered frequencies.

12. The method of claim 1, wherein controlling uplink transmission by the UE and/or by the other UE served by the serving network node to reduce uplink interference comprises:
coordinating a schedule of uplink transmissions for the UE between the serving network node and the interfered network node; and
controlling uplink transmission from the UE responsive to the coordinated schedule.

13. A method in at least one network node which provides wireless communications service for user equipment nodes, UEs, the method comprising:
detecting uplink interference at an interfered network node;
initiating an uplink transmission by a UE, which is served by a serving network node, of an uplink signal having a defined configuration, responsive to the uplink interference, wherein initiating the uplink transmission by the UE of the uplink signal having the defined configuration comprises controlling the UE and at least another one of the UEs from the serving network node in response to the defined configuration to cause transmission of uplink signals from the controlled UEs at different defined frequencies, different defined timings, and/or different defined signal codes to allow separate detection of each of the uplink signals at the interfered network node;
detecting the uplink signal using the defined configuration at the interfered network node;
identifying the UE responsive to the detected uplink signal as being a contributor to the uplink interference; and
controlling uplink transmission by the UE and/or by another UE served by the serving network node to reduce uplink interference,
wherein:
detecting the uplink signal using the defined configuration at the interfered network node comprises detecting at least one of the uplink signals transmitted by the controlled UEs; and
identifying the UE responsive to the identified uplink signal comprises comparing a frequency, a timing, and/or a signal code associated with each detected at least one of the uplink signals to the defined frequency, the defined timing, and/or the defined signal code at which the uplink signals were transmitted; and
controlling uplink transmission by the UE and/or by another UE served by the serving network node to reduce uplink interference comprises adjusting configuration of at least one uplink signal to be transmitted by the identified at least one of the controlled UEs to reduce the uplink interference.

14. A first network node of a wireless communications network, the first network node comprising:
a network interface that is configured to communicate with a second network node;
at least one transceiver that is configured to communicate with a user equipment node, UE; and
a processor that is configured to:
receive an interference message from the second network node reporting uplink interference detected by the second network node;
determine a defined configuration of an uplink signal to be transmitted by the UE, responsive to the indication of the uplink interference;
communicate to the second network node via the network interface an uplink configuration message that identifies the defined configuration of the uplink signal to be transmitted by the UE; and
control the UE via the at least one transceiver in response to the defined configuration to cause transmission of the uplink signal with the defined configuration;
receive an uplink signal message from the second network node via the network interface reporting receipt of the uplink signal transmitted by the UE;
identify the UE responsive to the uplink signal message as being a contributor to the uplink interference; and
control uplink transmission by the UE and/or another UE communicating with the at least one transceiver to reduce uplink interference.

15. The first network node of claim 14, wherein the processor is further configured to:
- configure the uplink configuration message to identify a defined frequency, a defined timing, and/or a defined signal code to be used by the UE to transmit the uplink signal; and
- control the UE in response to the defined configuration to cause transmission of the uplink signal at the defined frequency, at the defined timing, and/or with the defined signal code.

16. The first network node of claim 14, wherein the processor is further configured to:
- select the UE from among a plurality of the UEs served by the first network node in response to a neighbor cell report received from the second network node and/or in response to a neighbor cell report from the UE.

17. The first network node of claim 14, wherein the processor is further configured to:
- identify one or more frequencies used by the second network node that are interfered with by the uplink signal transmitted by the UE; and
- control one or more frequencies used by the UE to avoid the identified one or more frequencies interfered with by the uplink signal transmitted by the UE.

* * * * *